United States Patent [19]

Schmit et al.

[11] Patent Number: 5,499,263
[45] Date of Patent: Mar. 12, 1996

[54] MULTIPLEXING ARRANGEMENT

[75] Inventors: Jean-Jacques Schmit, Clos de la Rivière; Daniel F. J. Van De Pol, Acacialei; Rudy Van Eeckhout, Beerzel, all of Belgium

[73] Assignee: Alcatel N.V., Amsterdam, Netherlands

[21] Appl. No.: 195,259

[22] Filed: Feb. 14, 1994

[30] Foreign Application Priority Data

Feb. 22, 1993 [EP] European Pat. Off. ............ 93200483

[51] Int. Cl.$^6$ .................................................. H04J 3/02
[52] U.S. Cl. ........................................................ 370/112
[58] Field of Search ............................. 370/84, 112, 66, 370/60, 60.1, 61, 68, 102; 327/407

[56] References Cited

U.S. PATENT DOCUMENTS

| | | | |
|---|---|---|---|
| 4,320,501 | 3/1982 | Le Dieu et al. | 370/68 |
| 4,593,390 | 6/1986 | Hildebrand et al. | 370/112 |
| 5,243,600 | 9/1993 | Mori et al. | 370/112 |
| 5,267,236 | 11/1993 | Stephenson, Jr. | 370/84 |
| 5,301,184 | 4/1994 | Uriu et al. | 370/60 |
| 5,303,231 | 4/1994 | Shinomiya et al. | 370/60 |

FOREIGN PATENT DOCUMENTS

| | | |
|---|---|---|
| 0289400 | 11/1988 | European Pat. Off. . |
| 0374436 | 6/1990 | European Pat. Off. . |

OTHER PUBLICATIONS

Proceedings International Switching Symposium, vol. 2, 15 Mar. 1987, Phoenix (U.S.) pp. 462–469. M. Becker et al 'A protocol and prototype for broadband subscriber access to ISDNs' p. 465, Col. 2, line 19; p. 466, Col. 2, line 32.

Primary Examiner—Douglas W. Olms
Assistant Examiner—Chau T. Nguyen
Attorney, Agent, or Firm—Ware, Fressola, Van Der Sluys & Adolphson

[57] ABSTRACT

A circuit is provided for multiplexing data packets, each having sets of n digital words and a residual set of r digital words. The multiplexing arrangement includes an output terminal (OUT), input memory units (RAM0–RAM3) each to receive and to store the data packets in memory portions and each to store n digital words, and a multiplexer (MUX) coupled to the input memory units (RAM0–RAM3) and to transfer the data packets thereof to the output terminal (OUT). The circuit also includes a register (RGN) and a residual register (RGR), each connected in parallel to the input memory units (RAM0–RAM3). The register (RGN) reads and transfers the sets of n digital words to the multiplexer (MUX). The residual register (RGR) reads and transfers the residual set of r digital words to the multiplexer (MUX). The multiplexer (MUX) combines the set of n digital words and the residual set of r digital words, forming a combined set, and providing at least a portion of the combined set to the output terminal (OUT).

10 Claims, 5 Drawing Sheets

PHASE 3 : if 2r < n

FIG. 6

PHASE 4

FIG. 7

MULTIPLEXING ARRANGEMENT

The present invention relates to a multiplexing arrangement adapted to multiplex data packets each constituted by a plurality of sets of n digital words and by at least one set of r digital words, with r smaller than n, said multiplexing arrangement including an output terminal, a plurality of input memory units each adapted to receive and to store at least one of said data packets and comprising a plurality of memory portions each able to store n digital words, and a multiplexing means coupled to said input memory units and adapted to transfer the data packets thereof to said output terminal.

BACKGROUND OF THE INVENTION

Such a multiplexing arrangement is generally known in the art and therein each of the input memory units in turn receive a data packet. If r had been equal to n, the number, say y, of digital words constituting a data packet would be a multiple of n and could thus be stored in a finite number of memory portions of an input memory unit. A standard multiplexer means could then be used to sequentially read the contents of the memory portions of a first input memory unit and transfer them to the output terminal until a complete data packet is read, and this prior to reading the memory portions of, e.g., a second input memory unit. The input memory units could thus be handled sequentially and in a cyclic way. An optimal output speed of the data packets is then obtained because the digital words of the data packets are transmitted to the output terminal in a continuous way, i.e. without gaps between two consecutive data packets.

However if n is not a sub-multiple of y, one of the memory portions, generally the last one, contains a set of only r digital words instead of n, r being the rest of the division of y by n. If the above mentioned standard multiplexer means is then used in the multiplexing arrangement, the data packets are transmitted to the output terminal with gaps of n−r digital words between two consecutive data packets. As a result, the output speed of these data packets is negatively affected.

The case where r is smaller than n is however possible in telecommunication systems where for instance Asynchronous Transfer Mode (ATM) data packets or cells of y=53 digital words of one byte each are transmitted and where the input memory units have memory portions of, e.g., n=4 digital words or bytes. In that case, each data packet requires 14 memory portions and the $14^{th}$ or last memory portion contains only r=1 digital word or byte. When using the above mentioned multiplexing arrangement, the successive data packets will be separated, at the output terminal, by a gap having a length of n-r=3 digital words whereby, as already mentioned, the output speed is obviously reduced with respect to that of data packets transmitted without gaps.

SUMMARY OF THE INVENTION

An object of the present invention is to provide a multiplexing arrangement of the above known type but wherein the data packets are provided in a continuous way at the output terminal, i.e. without gaps between two consecutive data packets, even if the length of these packets is not an exact multiple of n.

According to the invention, this object is achieved due to the fact that said multiplexing arrangement further includes input means able to read from said memory portions of said input memory units a said set of r digital words and a said set of n digital words simultaneously and to transfer the read sets to said multiplexing means which is adapted to combine the read sets prior to transferring at least a portion of the combined sets to said output terminal.

In this way, the first sets of n digital words of a first data packet are transferred via the input means from the input memory units to the multiplexing means without the latter combining any sets prior to transferring them to the output terminal. When the set of r digital words, e.g. the last set of the first data packet, is read, the input means starts to read, simultaneously with that last set, the first set of n digital words of a second data packet, e.g. from a second input memory unit. After having combined the set of r digital words with the set of n digital words, only the n first digital words of these combined sets are transferred by the multiplexing means to the output terminal. As a result, there is no gap between the first and the second data packets when they are transferred to the output terminal. The remaining digital words of the combined sets, i.e. the digital words which are not yet transferred to the output terminal, are then combined with the n digital words of a second set of the second data packet received via the input means and again only the first n digital words of these newly combined sets are transferred to the output terminal. These operations are repeated until the combined sets comprise only n digital words at which moment a multiplexing cycle is completed.

In more detail, said input means includes:
  a first input register adapted to latch the read set of r digital words and comprising r latching cells each able to latch one digital word; and
  a second input register adapted to latch the read set of n digital words and comprising n latching cells each able to latch one digital word,
said input memory units being coupled to said first and second input register via a first and second plurality of gates respectively, and said gates being controlled by control means for allowing the transfer from said memory portions of either:
  one set of r digital words to said first input register;
  one set of n digital words to said second input register; or
  simultaneously one set of r digital words to said first input register and one set of n digital words to said second input register.

Another characteristic feature of the present invention is that said multiplexing means includes:
  buffer means coupled to said output terminal and adapted to latch said combined sets, said buffer means comprising r+n latching cells each able to latch one digital word;
  mixing means adapted to receive said read sets from said input means and to transfer them to first predetermined latching cells of said buffer means; and
  transfer means coupled to said buffer means and adapted to transfer digital words from second predetermined latching cells to third predetermined latching cells thereof.

Also another characteristic feature of the present invention is that n latching cells of said buffer means are coupled to said output terminal for transferring thereto n digital words, that said third predetermined latching cells are included in said n latching cells, and that the latter are located at the n left most consecutive cell locations of said buffer means.

Moreover, said second predetermined latching cells are located immediately after said n latching cells of said buffer means.

Still another characteristic feature of the present invention is that said n latching cells of said buffer means are connected in parallel to n respective latching cells of a parallel-in-serial-out register of which a serial output is connected to said output terminal.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
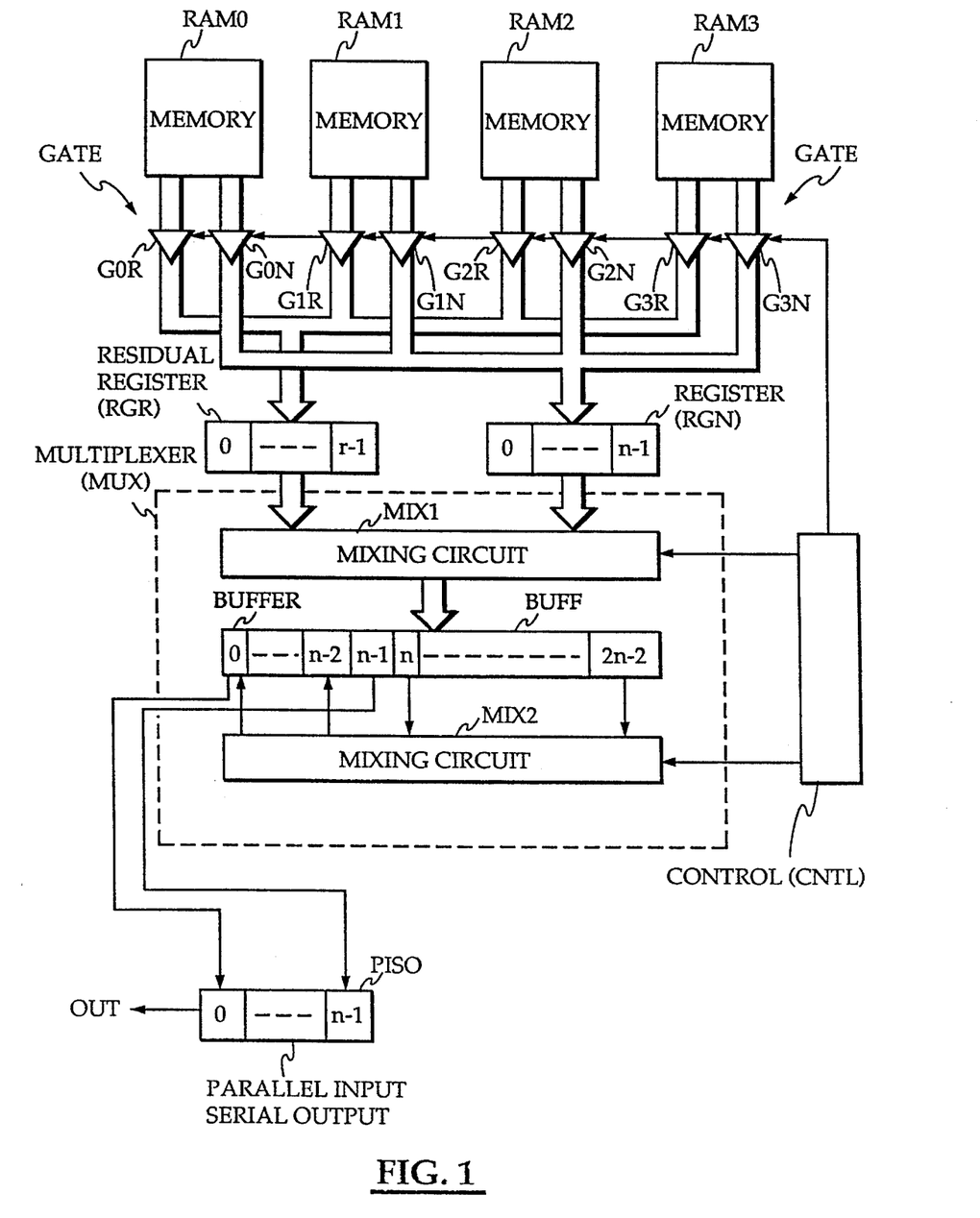
FIG. 1 shows a multiplexing arrangement according to the present invention and including a multiplexing circuit (MUX) to which various input memory units (RAM0, ..., RAM3) are coupled.

The multiplexing arrangement shown in FIG. 1 is used in an Asynchronous Transfer Mode (ATM) telecommunication switching network for multiplexing data packets of telecommunication data received from m different data sources into a flow of continuous data packets serially transmitted through an output terminal OUT.

Each data packet is constituted by y digital words and each digital word comprises x bits, x being at least equal to 1.

In the following example x is equal to 8 whereby each digital word forms a byte and a data packet is constituted by y=53 digital words or bytes. Furthermore, the number m of data sources is equal to 4.

The data packets received from the m=4 data sources are first stored in m=4 input memory units or data buffers RAM0, RAM1, RAM2 and RAM3 which are of the First-In-First-Out (FIFO) type. Such a data buffer is shown in more detail in FIG. 2 where it is generally referred to as RAM. RAM includes several memory portions each comprising n memory cells, each memory cell being able to store one digital word of a data packet. In the present example n is equal to 4 whereby a memory portion of RAM is able to store a maximum of 4 digital words or bytes. When a data packet arrives in the data buffer RAM, its n=4 first digital words 0, 1, 2 and 3 are stored in the 4 memory cells of a first memory portion of this RAM, the 4 following digital words 4, 5, 6 and 7 of the data packet are stored in the 4 memory cells of a next memory portion of RAM, and so further until the $53^{th}$ digital word is stored in a memory cell. In the present example, the $14^{th}$ memory portion of RAM stores only r=1 byte of the data packet, r being equal to the rest of the division of y=53 by n=4. The 3 remaining memory cells of this $14^{th}$ memory portion of RAM thus contain undefined data.

Figure 2:
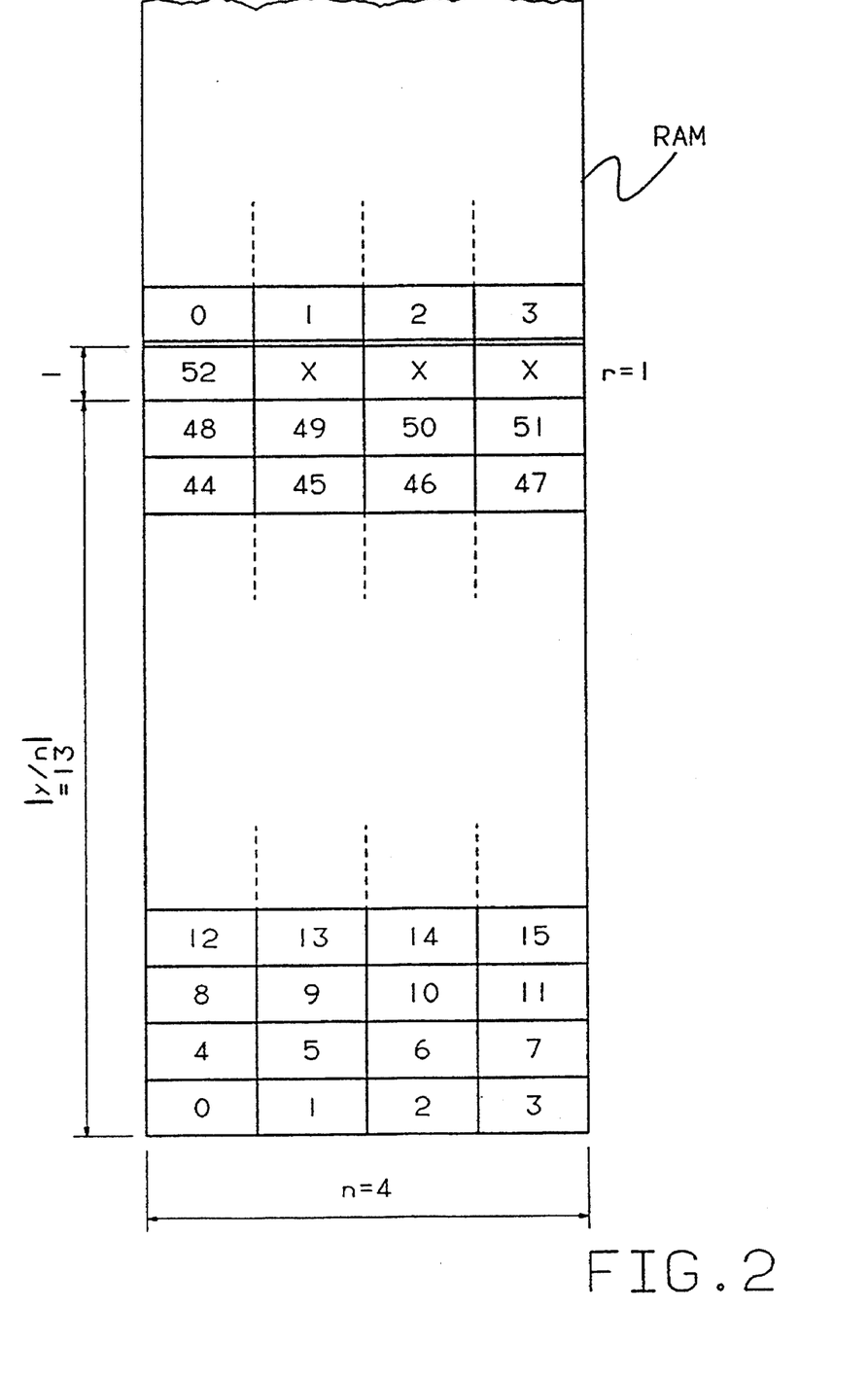
FIG. 2 shows one of the input memory units of FIG. 1 in more detail.

Generalizing, a complete data packet is stored in $\lfloor y/n \rfloor +1$ memory portions of a data buffer RAM, y being the number of digital words constituting the data packet, n being the number of memory cells constituting a memory portion of RAM, i.e. the number of digital words which may be stored in such a memory portion, and $\lfloor \ \rfloor$ indicating the absolute value of the division of y by n. In the present example, $\lfloor 53/4 \rfloor =13$ and the rest r of the division of y by n is equal 1.

Referring again to FIG. 1, the data buffers RAM0, ..., RAM3 are each connected to the multiplexing circuit MUX via a respective data gate G0R, G1R, G2R, G3R and an input register RGR to which all these data gates are connected, as well as via another respective data gate G0N, G1N, G2N, G3N and another input register RGN to which all these other data gates are connected. The input registers RGR and RGN are provided with r and n latching cells each able to latch one digital word and numbered 0 to r–1 and 0 to n–1 respectively. A control circuit CNTL controls both the gates G0R–G3R for allowing the transfer of the contents of a memory portion containing a set of r digital words to the input register RGR, and the gates G0N–G3N for allowing the transfer of the contents of a memory portion containing a set of n bytes to the input register RGN, these transfers being performed either independently or simultaneously as will be explained later.

The digital words latched in the registers RGR and/or RGN are transferred to a mixing circuit MIX1, which together with a buffer BUFF and a transfer circuit MIX2, is included in a multiplexing circuit MUX.

As will be explained later, the mixing circuit MIX1 combines the two sets of digital words received from the input registers RGR and RGN and transfers these combined sets to the buffer BUFF. This buffer BUFF comprises 2n–1 latching cells numbered 0, ..., n–2, n–1, n, ..., 2n–2 and is thus able to store a maximum of 2n–1 digital words. It is to be noted that the size 2n–1 of the buffer BUFF is equal to r+n because the largest value of r as defined above is n–1.

The buffer BUFF is further interconnected with the transfer circuit MIX2 which is adapted to read up to n–1 digital words from n–1 consecutive latching cells of BUFF and to rewrite these digital words into the left most consecutive latching cells of BUFF according to different transfer protocols explained below.

Finally, the contents of the n left most consecutive latching cells 0 to n–1 of the buffer BUFF are transmitted to a Parallel-In-Serial-Out register PISO which comprises n latching cells numbered 0 to n–1 . PISO is thus adapted to receive in parallel n digital words from BUFF prior to transmitting them in series to the output terminal OUT.

The operation of the multiplexing circuit MUX and more particularly of the mixing circuit MIX1 and the transfer circuit MIX2 thereof is controlled by the above control circuit CNTL which further synchronizes all the transfers of the digital words between the constituent parts of the multiplexing arrangement.

It is to be noted that in this preferred embodiment of the multiplexing arrangement the n left most consecutive latching cells of the buffer BUFF are used for transferring thereto the digital words to be transferred to the output terminal OUT but that it is also possible to use another set of n latching cells of BUFF for the same purpose.

Different phases, 0 to 5a/b, of the operation of the multiplexing arrangement for transferring to the register PISO, and thus to the output terminal OUT, a continuous flow of data packets read from the data buffers RAM0–RAM3 via the data gates G0R–G3R and G0N–G3N, are described in detail hereafter by making reference to the FIGS. 3 to 9.

In this following part of the description only the input registers RGR, RGN and the buffer BUFF are represented in detail, the mixing circuit MIX1 being represented by the connections it establishes between the input registers RGR/

RGN and the buffer BUFF and the transfer circuit MIX2 being represented by the interconnections it establishes within this buffer BUFF. In the following example, the output sequence of the data packets is as follows: a first data packet to be transmitted to the output terminal OUT via the register PISO connected to the n left most consecutive latching cells 0, . . . , n–1 of the buffer BUFF is stored in the data buffer RAM0, a second data packet is stored in RAM1, a third data packet in RAM2 and a fourth data packet in RAM3. This sequence may then be cyclically repeated, e.g. with a fifth data packet stored in the data buffer RAM0 and so on.

Figure 3:
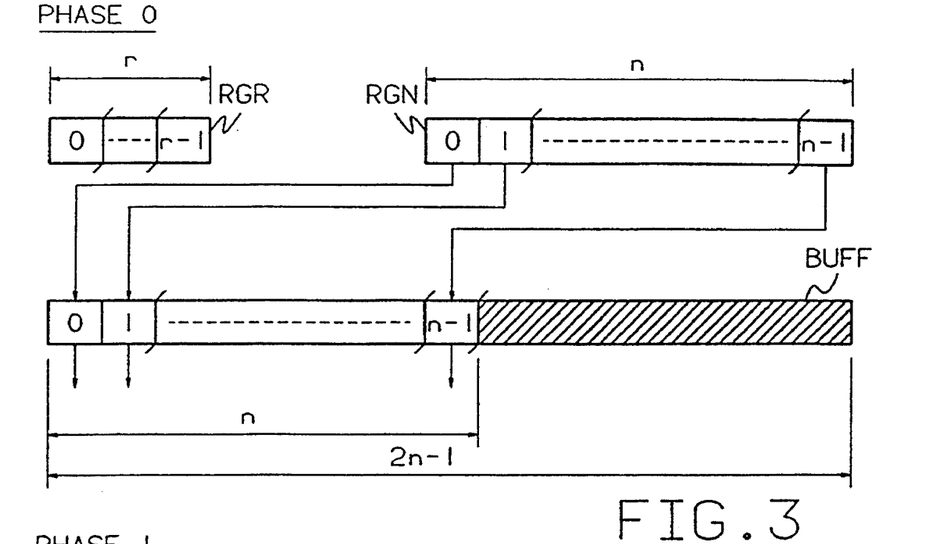
FIGS. 3 to 9 represent different phases of the operation of the multiplexing circuit (MUX) of FIG. 2.

A first phase 0 of the operation of the multiplexing arrangement is schematically represented in FIG. 3. The first set of n digital words of the first data packet stored in the data buffer RAM0 is loaded via the data gate G0N in the n latching cells 0, 1, . . . , n–1 of the input register RGN, whilst the input register RGR is not used. The mixing circuit MIX1 then transfers these n digital words from RGN to the n left most consecutive latching cells 0, 1, . . . , n–1 of the buffer BUFF. From there the n digital words are transmitted to the register PISO without any operation of the transfer circuit MIX2.

After this operation, the input register RGN is loaded with the following set of n digital words of the first data packet in RAM0 and the phase 0 is repeated. This phase is performed |y/n| times, i.e. until all the |y/n| memory portions of RAM0 containing the n*|y/n| first digital words of the first data packet are transmitted to the register PISO, * representing the multiplication sign.

Figure 4:
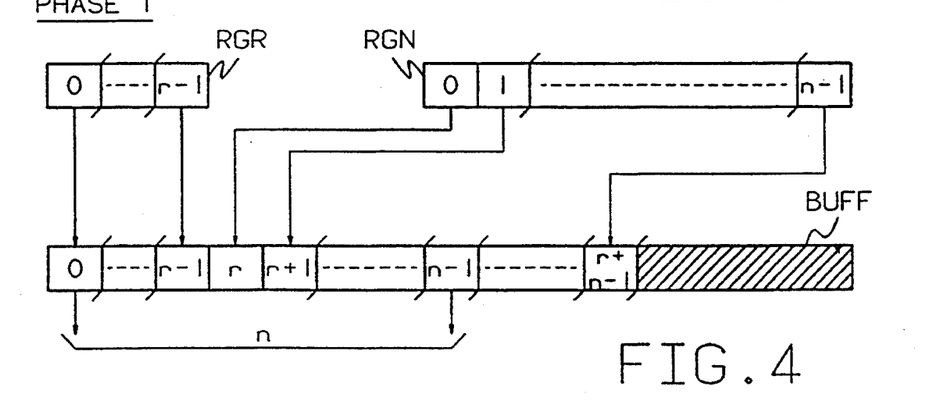

A phase 1 shown in FIG. 4 is then initiated in order to transmit the last set of r digital words of the first data packet in RAM0 and to have this last set immediately followed, at the output terminal OUT, by the n–r first digital words of the second data packet stored in RAM1. To this end, the latching cells 0, . . . , r–1 of the input register RGR are loaded with the set of r digital words of the first data packet in RAM0 via the data gate G0R, whilst the latching cells 0, 1, . . . , n–1 of the input register RGN are loaded with the first set of n digital words of the second data packet in RAM1, via the data gates G1N. The mixing circuit MIX1 then combines these two sets by juxtaposing them and transfers the thus obtained r+n digital words to the r+n left most consecutive latching cells 0, . . . , r–1, r, r+1, . . . , n–1, . . . , r+n–1, of the buffer BUFF. In more detail, the set of r digital words from RGR is then loaded in the r left most latching cells 0, . . . , r–1, of BUFF, while the set of n digital words from RGN is loaded in the n following latching cells r, r+1, . . . , n–1, . . . , r+n–1, of BUFF. Here again the transfer circuit MIX2 is inactive and the n digital words stored in the n left most latching cells 0, . . . , r–1, r, r+1, . . . , n–1, of the buffer BUFF are transmitted to the register PISO. This phase 1 is performed only once.

It is to be noted that, additionally to the r last digital words of the first data packet, only the n–r first digital words of the second data packets are transmitted to PISO. This means that the buffer BUFF still contains r digital words of the second data packet which need to be transferred to PISO and further to the output terminal OUT. This transfer is performed during the next phase 2 explained below.

Figure 5:
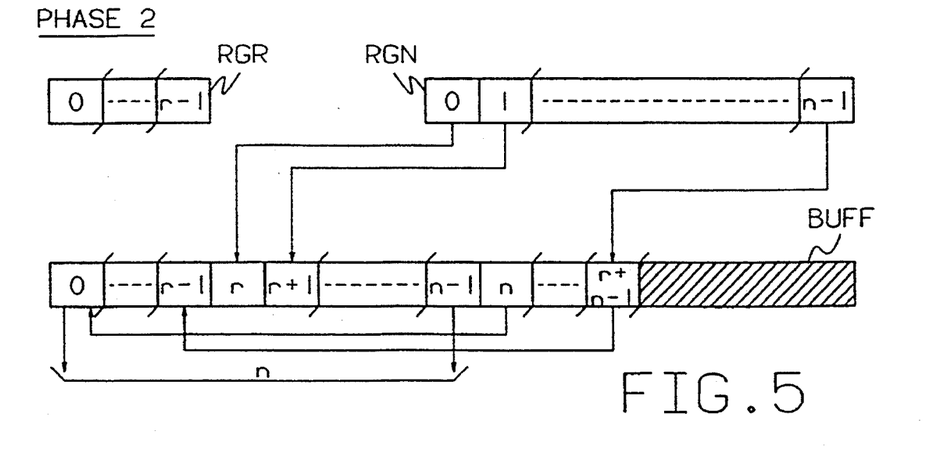

The following phase 2 is shown in FIG. 5. While, in phase 2, the second set of n digital words of the second data packet in RAM1 is loaded in RGN, the input register RGR is not used. A first step of this phase 2 is performed by the transfer circuit MIX2 which transfers or moves the r last digital words which are still stored in the latching cells n, . . . , r+n–1 of BUFF to the left most consecutive latching cells 0, . . . , r–1, of this buffer BUFF. A second step of the phase 2 is performed by the mixing circuit MIX1 which transfers the second set of n digital words of the second data packet from RGN to the latching cells r, r+1, . . . , n–1, n, . . . , r+n–1, of BUFF. Again the contents of the n left most consecutive latching cells 0, . . . , r–1, r, r+1, . . . , n–1 of BUFF are then transmitted to PISO. This phase 2 is repeated |y/n|–1 times.

It is to be noted that although in the above description phase 2 is split up into different steps, all these steps may be performed simultaneously, i.e. in "pipeline". Indeed, in a practical implementation the latching cells of the input registers RGR, RGN, of the buffer BUFF and of the parallel-in-serial-out register PISO may for instance be constituted by well known D-flipflops which are controlled by a same clock signal. As a result, the transfers of digital words from the input registers RGR/RGN to the buffer BUFF via MIX1, from the buffer BUFF to the left most consecutive latching cells thereof via MIX2, and from the latter latching cells to PISO are performed in pipeline. This is also valid for the next phases described below and allows to be obtain a continuous flow of digital words from the serial output of the register PISO to the output terminal OUT.

Figure 6:
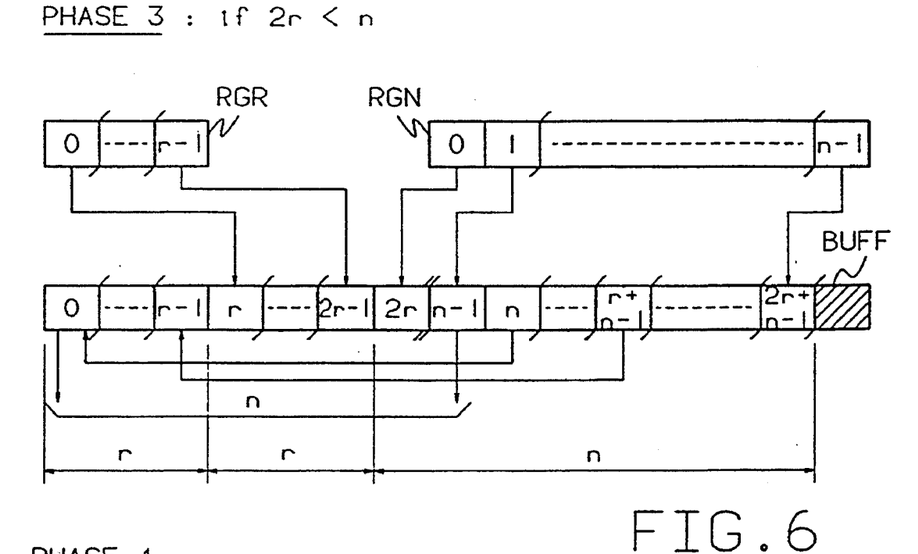

From here on and only for purpose of simplicity, we will suppose that the number n of digital words stored in a memory portion of RAM is greater than 2 times the rest r of the division of y by n, i.e. that 2r<n. In this case, a phase 3 as shown in FIG. 6 may be performed after the last phase 2. During this phase 3 the last set of r digital words of the second data packet in RAM1 is loaded in the input register RGR, whilst the first set of n digital words of the third data packet in RAM2 is simultaneously loaded in the input register RGN. As the above phase 2, phase 3 includes two steps of which the first one is performed by MIX2 which moves the r digital words still stored in the latching cells n, . . . , r+n–1, of BUFF to the r latching cells 0, . . . , r–1 thereof. The second step of phase 3 is performed by MIX1 which combines the contents of RGR and RGN and transfers the thus obtained r+n digital words to the latching cells r, . . . , 2r–1, 2r, n–1, n, . . . , r+n–1, . . . , 2r+n–1 of BUFF. As a result, the r digital words of RGR are now stored in the latching cells r, . . . , 2r–1, of BUFF, whilst the n digital words of RGN are now stored in the latching cells 2r, n–1, n, . . . , r+n–1, . . . , 2r +n–1 of BUFF.

It is to be noted that the relative position of the latching cells 2r and n–1 of the buffer BUFF, e.g. the number of latching cells separating them, is dependent of the values of r and n. In the present example, it is supposed that the latching cell n–1 immediately follows the latching cell 2r whereby the latching cell 2r +n–1 of BUFF contains the last digital word received from MIX1, i.e. the digital word of the last latching cell n–1 of RGN.

The contents of the n left most latching cells 0, . . . , r–1, r, . . . , 2r–1, 2r , n–1 of BUFF are then transferred to PISO. This phase 3 is performed only once and is followed by a phase 4 described below.

Figure 7:
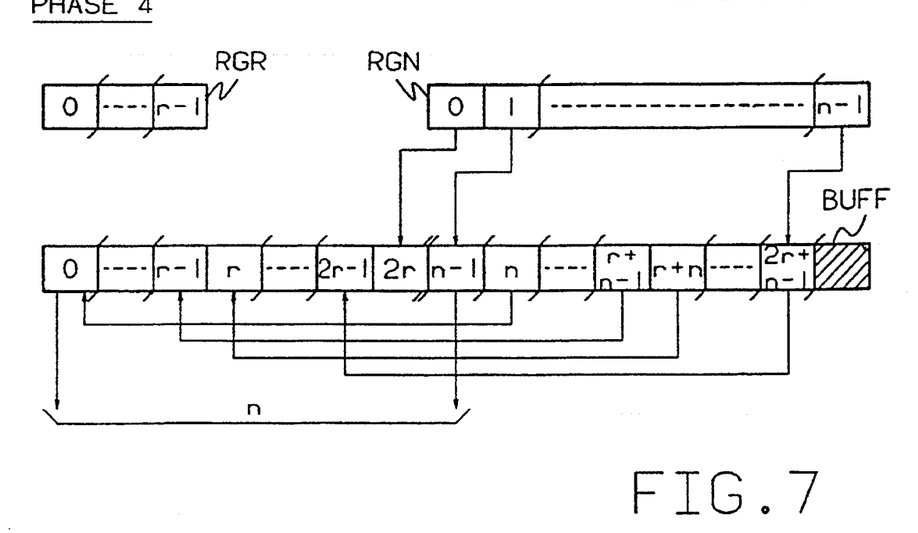

In the phase 4 shown in FIG. 7 the input register RGR is not used as in the above phases 0 and 2, whilst the input register RGN successively contains the next sets of n digital words of the third data packet stored in RAM2. In a first step of this phase 4 the transfer circuit MIX2 moves the 2r last digital words still stored in the latching cells n, . . . , r+n–1, r+n, . . . , 2r +n–1 of BUFF to the 2r left most latching cells 0, . . . , r–1, r, . . . , 2r–1 of this buffer BUFF. In a second step of the phase 4 the mixing circuit MIX1 transfers the n digital words latched in RGN to the n latching cells 2r , , n−1, n, ..., r+n−1, r+n, ..., 2r+n−1 of BUFF. As during all the preceding phases, the contents of the n left most consecutive latching cells 0, ..., r−1, r, ..., 2r−1, 2r, , n−1, of BUFF are then transferred to PISO. Similarly to the phase 2, this phase 4 is repeated ¦y/n¦−1 times.

After the last phase 4 is completed, a phase 5 is executed. Two practical cases, generally referred to as phase 5a and phase 5b, will be considered below. In the phase 5a, shown in FIG. 8, it is supposed that the number n of digital words stored in a memory portion of RAM is greater than 3 times the rest r of the division of y by n, i.e. that 3r<n, whilst in the phase 5b, shown in FIG. 9, it is supposed that this number n is equal to 3 times r, i.e. that 3r=n. These two cases will be described in more detail hereafter.

Figure 8:
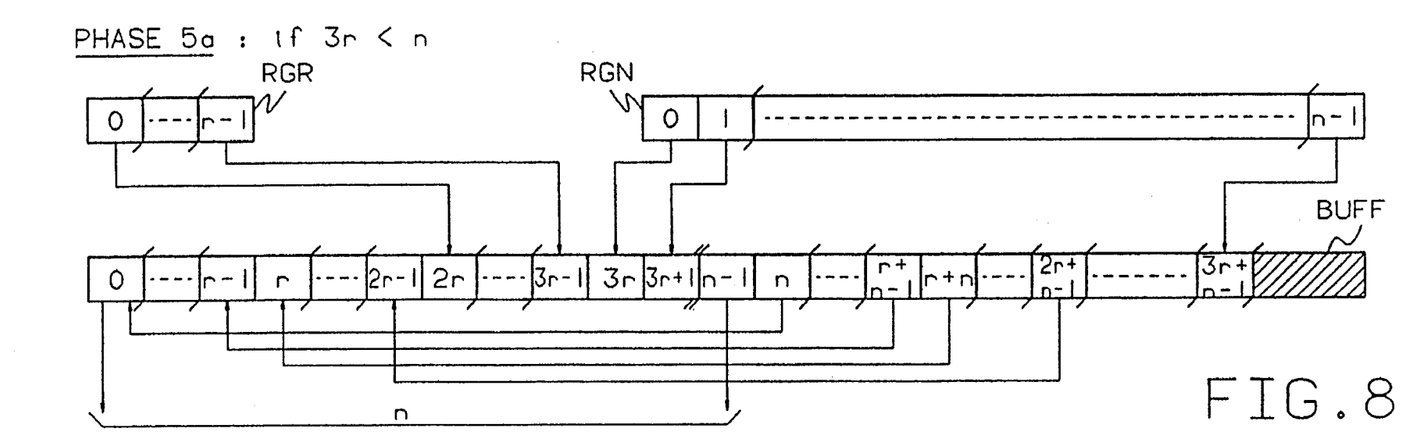

In the phase 5a, the input register RGR contains the last set of r digital words of the third data packet in RAM2, whilst the input register RGN contains the first set of n digital words of the fourth data packet in RAM3. This phase 5a includes a first step during which the transfer circuit MIX2 moves the contents of the 2r latching cells n, ..., r+n−1, r+n, ..., 2r+n−1, of the buffer BUFF to the 2r left most latching cells 0, ..., r−1, r, ..., 2r−1 of this buffer BUFF. During a second step of the phase 5a, the mixing circuit MIX1 combines and transfers the r digital words contained in RGR to the r latching cells 2r, ..., 3r−1, of BUFF and the n digital words contained in RGN to the n latching cells 3r, 3r+1, n−1, n, ..., r+n−1, r+n, ..., 2r+n−1, ..., 3r+n−1 of this buffer BUFF. As usually, the contents of the n left most consecutive latching cells 0, ..., r−1, r, .., 2r−1, 2r, ..., 3r−1, 3r, 3r+1, , n−1 of BUFF are then transferred to PISO. The phase 5a is performed only once.

It is to be noted that the relative position of the latching cells 3r+1 and n−1, of the buffer BUFF, e.g. the number of latching cells separating them, is obviously dependent of the values of r and n. In the present example, it is supposed that the latching cell n−1 immediately follows the latching cell 3r+1 whereby the latching cell 3r+n−1 of BUFF contains the last digital word received from MIX1, i.e. the digital word of the last latching cell n−1 of RGN.

According to the values of r and n, the phase 5a is followed either by a phase similar to the above phase 2 or by a phase similar to the above phase 4 in order to further transfer the next sets of n digital words of the fourth data packet in RAM3 to the output terminal OUT. After having transferred the digital words of the fourth data packet in RAM3, a fifth data packet may be read from the data buffer RAM0 and so further in a cyclic way as described above.

Figure 9:
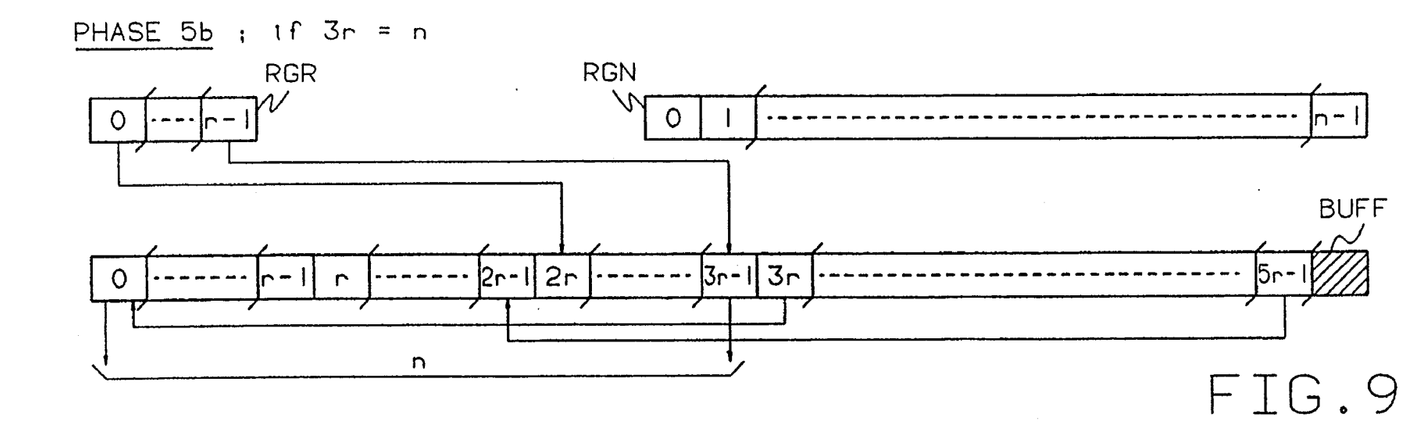

In the phase 5b, the input register RGR also contains the last set of r digital words of the third data packet in RAM2 but the input register RGN is not used. This phase 5b includes a first step during which the transfer circuit MIX2 moves the contents of the 2r latching cells 3r, ..., 5r−1 to the 2r left most latching cells 0, ..., r−1, r, ..., 2r−1, of the buffer BUFF. During a second step of this phase 5b, the mixing circuit MIX1 transfers the r digital words contained in RGR to the r latching cells 2r, ..., 3r−1 of BUFF. The contents of the n left most consecutive latching cells 0, ..., r−1, r, ..., 2r−1, 2r, ..., 3r−1 of BUFF are then transferred to PISO as usual. The phase 5b is performed only once and is followed by the above phase 0 for transferring the sets of n digital words of the fourth data packet contained in the data buffer RAM3 to the output terminal OUT.

As already mentioned, the above described cycle of 5 phases may be repeated, e.g. with a fifth, a sixth, ... data packet cyclically read from the m data buffers RAM0–RAM3.

It is to be noted that the control circuit CNTL mainly includes counters operating with the values of y, n and r for controlling the gates G0R–G3R, G0N–G3N, the mixing circuit MIX1 and the transfer circuit MIX2. Based on the above description of the operation of these circuits, the design of such a control circuit CNTL is relatively simple for a person ordinary skilled in the art and will therefore not be described in more detail hereafter.

In the above practical example of m=4 data buffers RAM0/RAM3 with memory portions adapted to store n=4 digital words or bytes of data packets each constituted by y=53 bytes, the output speed of the flow at the output terminal OUT is equal to VOUT=80 Mbyte/second if the data packets arrive at an input speed VIN which is greater or equal to VOUT/n, e.g. VIN=20 Mbyte/second.

Although in the above preferred embodiment the data buffers RAM0–RAM3 are read in sequence, it is also possible to read and thus to multiplex data packets stored in a same data buffer. The data gates G0R–G3R and G0N–G3N are then so controlled by the control circuit CNTL that the input registers RGR and RGR are adapted to simultaneously read two successive memory portions of that same data buffer.

Moreover, in the above example a data packet contains several sets of n digital words each and only one set of r digital words. It is however possible to adapt the present multiplexing arrangement to handle data packets constituted by successive sets of a variable number of digital words each, the maximum number of digital words in a set being n. In that case, not only the two input registers RGR and RGN must be able to read simultaneously two successive memory portions of a same data buffer RAM0–RAM3 but the control circuit CNTL must know the number of digital words stored in each memory portion of these data buffer in order to control the data gates G0R–G3R, G0N–G3N and the multiplexing circuit MUX accordingly.

For these reasons, while the principles of the invention have been described above in connection with specific apparatus, it is to be clearly understood that this description is made only by way of example and not as a limitation on the scope of the invention.

We claim:

1. A circuit for multiplexing data packets, each having a set of n digital words and a residual set of r digital words, where n and r are integers and r is smaller than n, said multiplexing arrangement including an output terminal (OUT), a plurality of input memory units (RAM0–RAM3) each to receive and to store at least one of said data packets in a plurality of memory portions each to store n digital words, and a multiplexing means (MUX) coupled to said plurality of input memory units (RAM0–RAM3) and to transfer the data packets thereof to said output terminal (OUT), characterized in that said circuit further includes register means (RGN) and residual register means (RGR), each connected in parallel to said plurality of input memory units (RAM0–RAM3), said register means (RGN) for reading and transferring said set of n digital words to said multiplexing means (MUX), said residual register means (RGR) for reading and transferring said residual set of r digital words to said multiplexing means (MUX), said multiplexing means (MUX) combining said set of n digital words and said residual set of r digital words, forming a combined set, and providing at least a portion of the combined set to said output terminal (OUT).

2. A circuit according to claim 1, characterized in that:

said residual register means (RGR) comprises r latching cells (0, ..., r–1) each for latching a respective digital word;

said register means (RGN) comprises n latching cells (0, ..., n–1) each for latching a respective digital word; and in that said circuit further includes a first plurality of gates (G0N–G3N) for connecting said plurality of input memory units (RAM0–RAM3) to said register means (RGN);

a second plurality of gates (G0R–G3R) for connecting said plurality of input memory units (RAM0–RAM3) to said residual register means (RGR); and control means (CNTL) for selectively controlling said first plurality of gates (G0N–G3N) and second plurality of gates (G0R–G3R) for transferring from said plurality of memory portions either:

one set of r digital words to said residual register means (RGR);

one set of n digital words to said register means (RGN); or simultaneously one residual set of r digital words to said residual register means (RGR) and one set of n digital words to said register means (RGN).

3. A circuit according to claim 1, characterized in that said multiplexing means (MUX) includes:

buffer means (BUFF) coupled to said output terminal (OUT) to latch the combined set, said buffer means (BUFF) comprising at least r+n latching cells (0, ..., 2n–2) each to latch a respective digital word;

mixing means (MIX1) to receive and transfer said residual set of r digital words and said sets of n digital words from said residual register means (RGR) and said register means (RGN) to first predetermined latching cells of said buffer means (BUFF); and transfer means (MIX2) coupled to said buffer means (BUFF) and to transfer digital words from second predetermined latching cells to third predetermined latching cells of said buffer means (BUFF).

4. A circuit for multiplexing according to claim 3, characterized in that n latching cells (0, ..., n–1) of said buffer means (BUFF) are coupled to said output terminal (OUT) for transferring thereto n digital words, and that said third predetermined latching cells are included in said n latching cells.

5. A circuit for multiplexing according to claim 4, characterized in that said n latching cells (0, ..., n–1) are located at the n left most consecutive cell locations of said buffer means (BUFF).

6. A circuit for multiplexing according to claim 5, characterized in that said second predetermined latching cells are located immediately after said n latching cells (0, ..., n–1) of said buffer means (BUFF).

7. A circuit for multiplexing according to claim 4, characterized in that said n latching cells (0, ..., n–1) of said buffer means (BUFF) are connected in parallel to n respective latching cells (0, ..., n–1) of a parallel-in-serial-out register (PISO) of which a serial output is connected to said output terminal (OUT).

8. A circuit for multiplexing according to claim 7, characterized in that it includes control means (CNTL) for controlling the operation of said transfer means (MIX2) and of said mixing means (MIX1) and that said third predetermined latching cells are located at the left most consecutive cell locations of said buffer means (BUFF) and are immediately followed by said first predetermined latching cells.

9. Circuit for multiplexing according to claim 3, characterized in that said second and third predetermined latching cells comprise a same number of latching cells, said number varying from 0 to n–1.

10. A circuit for multiplexing according to claim 1, characterized in that each of said data packets is constituted by y digital words and that said one residual set of r digital words of a data packet is constituted by the last r digital words of said data packet, r being the remainder of the division of y by n.

* * * * *